(12) United States Patent
Middleton et al.

(10) Patent No.: US 10,707,977 B2
(45) Date of Patent: Jul. 7, 2020

(54) NETWORK NODE AND METHOD FOR OUTER LOOP LINK ADAPTION

(71) Applicant: Telefonaktiebolaget LM Ericsson (publ), Stockholm (SE)

(72) Inventors: Richard Middleton, North Lambton (AU); Ramon Delgado, Elermore Vale (AU); Katrina Lau, Wallsend (AU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/326,796

(22) PCT Filed: Apr. 28, 2017

(86) PCT No.: PCT/SE2017/050417
§ 371 (c)(1),
(2) Date: Feb. 20, 2019

(87) PCT Pub. No.: WO2018/070910
PCT Pub. Date: Apr. 19, 2018

(65) Prior Publication Data
US 2019/0238242 A1    Aug. 1, 2019

Related U.S. Application Data

(60) Provisional application No. 62/406,205, filed on Oct. 10, 2016.

(51) Int. Cl.
*G01R 31/08* (2020.01)
*H04B 17/309* (2015.01)
(Continued)

(52) U.S. Cl.
CPC .............. *H04B 17/309* (2015.01); *H04L 1/00* (2013.01); *H04L 1/0001* (2013.01);
(Continued)

(58) Field of Classification Search
None
See application file for complete search history.

(56) References Cited

U.S. PATENT DOCUMENTS

2009/0003471 A1* 1/2009 Bick .................... H04L 27/2678
375/260
2013/0308479 A1* 11/2013 Schober ................ H04L 1/0034
370/252

(Continued)

FOREIGN PATENT DOCUMENTS

EP        2887572 A1    6/2015
WO    2014093679 A1    6/2014

*Primary Examiner* — Gerald A Smarth
(74) *Attorney, Agent, or Firm* — Murphy, Bilak & Homiller, PLLC

(57) ABSTRACT

Embodiments herein relate to a network node operable in a radio communication network and a method performed by the network for communication between the network node and a wireless device. The method comprises obtaining (110) information associated with a channel quality of a channel between the network node and the wireless device; and estimating (120) respective one or more variables associated with the channel quality based on the obtained channel quality information. The method (100) further comprises determining (130) an Outer Loop Link Adaptation, OLLA, adjustment based on the obtained channel quality information, and based on the estimated respective one or more variables associated with the channel quality, and when the obtained channel quality information indicates that the channel performance is acceptable: also based on a Sequential Hypothesis Testing, SHT, of the obtained channel quality information.

16 Claims, 7 Drawing Sheets

(51) Int. Cl.
*H04L 1/00* (2006.01)
*H04B 17/318* (2015.01)
*H04L 1/18* (2006.01)
*H04L 12/26* (2006.01)

(52) U.S. Cl.
CPC .......... *H04B 17/318* (2015.01); *H04L 1/1812* (2013.01); *H04L 43/0888* (2013.01)

(56) References Cited

U.S. PATENT DOCUMENTS

| | | |
|---|---|---|
| 2013/0310091 A1 | 11/2013 | Tabet et al. |
| 2015/0263830 A1 | 9/2015 | Li et al. |
| 2017/0353930 A1* | 12/2017 | Su .................. H04W 52/262 |
| 2018/0103442 A1* | 4/2018 | Janse van Rensburg .................... H04W 52/241 |

* cited by examiner

NETWORK NODE AND METHOD FOR OUTER LOOP LINK ADAPTION

TECHNICAL FIELD

The present disclosure relates to radio communication and in particular to a network node and a method performed thereby for communication between the network node and a wireless device.

BACKGROUND

In 4th Generation, 4G, and 5th generation, 5G, mobile communication networks link adaptation may be used to select an appropriate Modulation and Coding Scheme (MCS). A MCS may be selected based on the available channel information and on a target criterion such as to achieve a given block error rate (BLER) target. In order to select an appropriate MCS, link adaptation relies on measurements provided by the user equipment (UE). These measurements are known as channel quality information (CQI). The base station uses the reported CQI to assign an appropriate MCS to each user. In practice, CQI reports may provide inaccurate or biased information. This may be due to delays in CQI reporting, to missing CQI reports and other reasons. These CQI inaccuracies can cause the network to perform worse than it should and the overall capacity of the network may be affected. The base station also receives acknowledgements that are submitted by a UE after every transmission. These acknowledgements could be either Automatic Repeat Request (ARQ) or Hybrid ARQ (HARQ). In HARQ for example, a HARQ ACK (ACK for short) is reported when the last transmission is correctly decoded and a HARQ NACK (NACK for short) is reported if the UE was not able to decode the last transmission. These HARQ acknowledgments are used by an outer loop in link adaptation to compensate the inaccuracies on the CQI reports. This strategy is known as outer loop link adaptation (OLLA). OLLA is usually implemented as a controller that corrects the current Signal to Interference and Noise Ratio, SINR, estimate, i.e. the controller computes a compensated SINR that is equal to the current SINR estimate plus an outer loop adjustment. The controller for outer loop link adaptation is commonly designed such that an estimate of the BLER based on the HARQ acknowledgments matches a given BLER target.

A classic strategy for outer loop link adaptation to match the BLER estimate with the BLER target is to step up the outer loop adjustment when an ACK is received and to step down the outer loop adjustment when a NACK is received. The ratio between the size of the step up and the step down is chosen to be equal to the ratio between the BLER target and one minus the BLER target. This outer loop link adaptation strategy achieves the desired BLER target.

For OLLA two main features are desired: first OLLA should quickly react to a large change in the SINR inaccuracies. This feature takes great relevance when a UE has just been connected to a base station. When the OLLA response is slow, a recently connected UE may have large transient time in link adaptation that results in an inefficient use of the radio resources. A fast response of the OLLA is also desirable when a large change in the radio channel conditions occurs. These large changes affect the performance of link adaptation mainly because of the delays involved in the CQI reporting. The second desirable feature in OLLA is that it should avoid unnecessary perturbations of the current SINR estimate. The outer loop adjustment should not change when the BLER estimate is close to a BLER target. This reduces the effect of the OLLA over other control mechanisms involved in the communication between a base station and the UE.

Another classic strategy for OLLA is stepping up and stepping down the outer loop adjustment with every HARQ acknowledgement. This strategy has a trade-off between the two desirables features described above. This trade-off is intrinsic in the choice of the step sizes. When the step sizes are chosen to take large values, the outer loop adjustment will quickly compensate for a large change in the inaccuracies of the SINR estimate, but this is at the cost of having large variance around the BLER target. On the other hand, when the step sizes are chosen to take small values, then the variance of the BLER estimate around the BLER target will be small. However, this is at the cost of having a slow response when a large change in the SINR inaccuracies occurs.

SUMMARY

The object is to obviate at least some of the problems outlined above. In particular, it is an object to provide a network node and a method performed thereby for communication between the network node and a wireless device. These objects and others may be obtained by providing a network node and a method performed by a network node according to the disclosure herein.

According to an aspect a method performed by a network node operable in a radio communication network for communication between the network node and a wireless device is provided. The method comprises obtaining information associated with a channel quality of a channel between the network node and the wireless device; and estimating respective one or more variables associated with the channel quality based on the obtained channel quality information. The method further comprises determining an Outer Loop Link Adaptation, OLLA, adjustment based on the obtained channel quality information, and based on the estimated respective one or more variables associated with the channel quality, and when the obtained channel quality information indicates that the channel performance is acceptable: also based on a Sequential Hypothesis Testing, SHT, of the obtained channel quality information.

According to an aspect a network node operable in a radio communication network for communication between the network node and a wireless device is provided. The network node is configured for obtaining information associated with a channel quality of a channel between the network node and the wireless device; and estimating respective one or more variables associated with the channel quality based on the obtained channel quality information. The network node is further configured for determining an Outer Loop Link Adaptation, OLLA, adjustment based on the obtained channel quality information, and based on the estimated respective one or more variables associated with the channel quality, and when the obtained channel quality information indicates that the channel performance is acceptable: also based on a Sequential Hypothesis Testing, SHT, of the obtained channel quality information.

The network node and the method performed thereby have several possible advantages. One possible advantage is that the network node may take control actions less often. This is a consequence of that the network node not having to update the outer loop adjustments whenever the perceived variable representative of the channel quality is within a desired predefined range. This may be beneficial because it may reduce the perturbations introduced by an outer loop controller in a compensated SINR estimate. This helps to reduce the effects over other control mechanisms involved in the communication between the network node and the wireless device. Another possible advantage is that switching between control operation modes wherein the SHT is either involved or not may allow the OLLA to quickly respond to a large change in the SINR inaccuracies, and this may be achieved without a significant increase on the variance of the instantaneous BLER around a BLER target. All these features may improve the performance of the OLLA, and may result in an appropriate MCS selection. This may ultimately lead to a better use of the radio resources.

BRIEF DESCRIPTION OF DRAWINGS

Embodiments will now be described in more detail in relation to the accompanying drawings, in which.

DETAILED DESCRIPTION

Briefly described, an aspect of the proposed solution is the use of Sequential Hypothesis Testing (SHT) to keep the BLER within a desired range. An advantage of this approach is that SHT detects with a minimum number of measurements when the perceived BLER is outside of the desired BLER range.

It is desired that OLLA should quickly react to a large change in the SINR inaccuracies. This feature takes great relevance when a wireless device has just been connected to a base station. When the OLLA response is slow, a recently connected wireless device will have large transient time in link adaptation that results in an inefficient use of the radio resources. A fast response of the OLLA is also desirable when a large change in the radio channel conditions occurs. These large changes affect the performance of link adaptation mainly because of the delays involved in the CQI reporting. Another desirable feature in OLLA is that it should avoid unnecessary perturbations of the current SINR estimate. The outer loop adjustment should not change when the BLER estimate is close to a BLER target. This reduces the effect of the OLLA over other control mechanisms involved in the communication between a base station and the UE. These features may be achieved by the proposed solution using SHT.

Figure 1A:
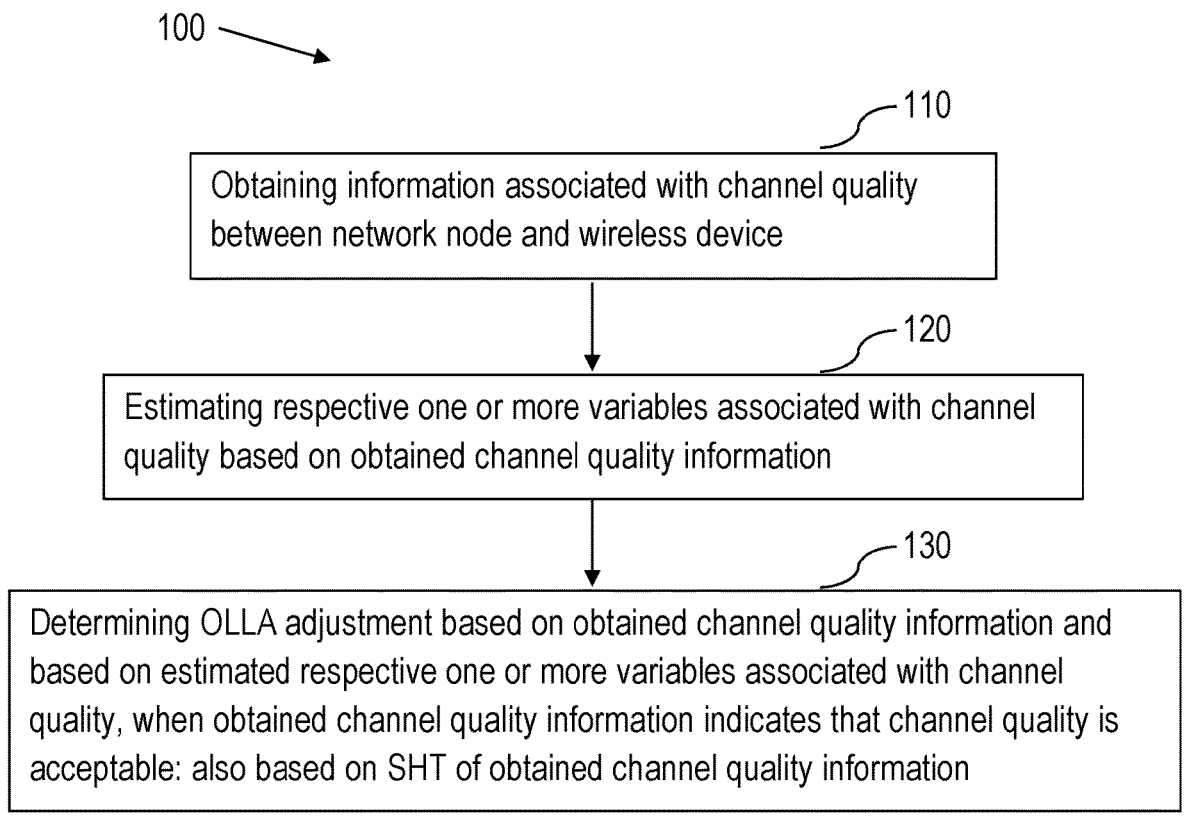
FIG. 1a is a flowchart of a method performed by a network node for communication between the network node and a wireless device, according to an exemplifying embodiment.

Exemplifying embodiments of a method performed by a network node operable in a radio communication network for communication between the network node and a wireless device will now be described with reference to FIGS. 1a-1c. FIG. 1a illustrates the method 100 comprising obtaining 110 information associated with a channel quality of a channel between the network node and the wireless device; and estimating 120 respective one or more variables associated with the channel quality based on the obtained channel quality information. The method 100 further comprises determining 130 an Outer Loop Link Adaptation, OLLA, adjustment based on the obtained channel quality information, and based on the estimated respective one or more variables associated with the channel quality, and when the obtained channel quality information indicates that the channel performance is acceptable: also based on a Sequential Hypothesis Testing, SHT, of the obtained channel quality information.

By obtaining the information associated with a channel quality of a channel between the network node and the wireless device, the network node is provided with information whether the wireless device is able to correctly receive signal(s), or information comprised in the signal(s) or not. The same is valid for signals and/or information transmitted by the wireless device to the network node. Consequently, the method is applicable to both uplink and downlink transmissions. The network node may be provided with this information by means of e.g. the wireless device sending ACK/NACK acknowledgements and also with measurements of the SINR (using CQI reports).

The channel quality may be represented by different variables and/or parameters as will be explained in more detail below. The network node may make use of only one of such variables and/or parameters or a combination of two or more such variables and/or parameters. The network node thus makes an estimate of the respective one or more variables associated with the channel quality based on the obtained channel quality information. The obtained channel quality may comprise information indicative of a Signal to Noise and Interference Ratio, SINR, associated with the channel, indications of needed retransmissions, failure to correctly decode and/or demodulate any received signals and/or information carried by received signals. This will be explained in more detail below.

The network node may then determine the OLLA adjustment based on the obtained channel quality information, and based on the estimated respective one or more variables associated with the channel quality, and when the obtained channel quality information indicates that the channel performance is acceptable: also based on a Sequential Hypothesis Testing, SHT, of the obtained channel quality information. It may be that the channel performance is acceptable or unacceptable. Briefly, if the channel performance is acceptable, nothing dramatic may need to be done, whereas if the channel performance is unacceptable, the network node may need to take relatively strong and/or quick measures in order to improve or increase the probability that the wireless device will correctly receive transmitted signals/information. One example of such a measure may be to change the MCS to better reflect, or cope with, the current channel quality. How the network node may determine if a channel quality is acceptable or unacceptable is described in more detail below, however, briefly described, a variable or parameter representative of the channel quality should have a value within a predefined range in order for the channel performance to be deemed acceptable. If the value of such a variable or parameter representative of the channel quality is outside the predefined range, the channel performance may be deemed as unacceptable. It is pointed out that channel performance refers to the communication channel between the point where the signals are encoded and the point where the signals are decoded.

If the channel performance is acceptable, the network node may determine the OLLA adjustment based on the obtained channel quality information, based on the estimated respective one or more variables associated with the channel quality, and based on the SHT of the obtained channel quality information. The SHT in brief is a statistical method to compare two competing hypothesis. This hypothesis testing strategy determines which hypothesis is more likely to be true, and this is achieved with a minimum number of observations. Consequently, the SHT may quickly and efficiently provide information to the network node about how the OLLA adjustment should be changed from a previously determined value of the OLLA adjustment. The SHT may also quickly and efficiently provide information to the network node about the value of the OLLA adjustment.

However, if the channel performance is unacceptable, the network node may determine the OLLA adjustment based on the obtained channel quality information, and based on the estimated respective one or more variables associated with the channel quality. In an example, the OLLA adjustment may be associated with a difference between the respective estimated value of one or more of the variables and a target value of the respective one or more of the variables.

The method performed by the network node has several advantages. One possible advantage is that the network node may take control actions less often. This is a consequence of that the network node not having to update the outer loop adjustments whenever the perceived variable representative of the channel quality is within a desired predefined range. This may be beneficial because it may reduce the perturbations introduced by an outer loop controller in a compensated SINR estimate. This helps to reduce the effects over other control mechanisms involved in the communication between the network node and the wireless device. Another possible advantage is that switching between control operation modes wherein the SHT is either involved or not may allow the OLLA to quickly respond to a large change in the SINR inaccuracies, and this may be achieved without a significant increase on the variance of the instantaneous BLER around a BLER target. All these features may improve the performance of the OLLA, and may result in an appropriate MCS selection. This may ultimately lead to a better use of the radio resources.

The SHT of the obtained channel quality information may be performed against a respective predefined interval for the respective one or more variables associated with the channel quality information.

The channel quality may comprise one or more variables or parameters that are associated with, or representative of, the channel quality. Examples of such variables or parameters are given below. Generally, such variables and/or parameters are associated with values indicative of a measure, or level, of channel quality. Different variables may have different predefined interval defining when the channel quality is acceptable (a value of the variable or parameter is within the predefined interval for that variable or parameter) or not (a value of the variable or parameter is outside the predefined interval for that variable or parameter). Merely as a very simplified example only intended for illustration, assume that variable A has a predefined interval of 2-8. Then the channel performance may be deemed acceptable when the value of variable A is at least equal to 2 and at most equal to 8. Assume further that variable B has a predefined interval of −3 to +10. Then the channel performance may be deemed acceptable when the value of variable B is at least equal to −3 and at most equal to 10. Elaborating on this very simplified example, the network node may take one or both variables into consideration, wherein the channel performance may be deemed acceptable only if both variables lay within their respective predefined intervals or as long as one of them lies within its predefined interval.

The SHT may thus be performed for one or more variables, or parameters, associated with the channel quality information, or representative of the channel quality information.

The respective predefined interval may be defined by two end points, $p_0$ and $p_1$, wherein the SHT evaluates two hypotheses, H0: variable associated with the obtained channel quality information$\leq p_0$, and H1: variable associated with the obtained channel quality information$\geq p_1$.

By the two hypotheses H0 and H1, the SHT provides a result as to how likely it is that the channel is performing as intended. The SHT will thus provide the network node with an indication whether the variable or parameter representative of, or associated with, channel quality is within the interval, which may also be referred to as a described range.

The estimated variable may be Block Error Rate, BLER.

BLER is an example of the variable that is associated with, or representative of, the channel quality. In case the channel quality is relatively poor, a higher BLER is to be expected as compared to the case when the channel quality is relatively good. The BLER may also reflect how well the current MCS is handling the current radio conditions, which are representative of channel quality. If the BLER is relatively high, then the channel quality is relatively poor and the current MCS is not good enough in order for the receiver to correctly receive signals transmitted from the transmitter, i.e. from the network node to the wireless device or from the wireless device to the network node. A more aggressive MCS may be more successful in counteracting the radio conditions. Consequently, with a more aggressive MCS, the receiver may more successfully receive signals from the transmitter. Thus, the variable or parameter representative, or associated with, channel quality may also be representative of how well a current MCS is operating with current radio conditions. Relatively poor radio conditions with a proper selection of MCS may render the variable representative of channel quality to fall within the predefined interval for that variable.

The estimated variable may be (a) probability that transmission power is within a predefined range, or (b) probability that user throughput is within a predefined range.

In this disclosure, BLER is generally used as an example of the estimated variable representative of the channel quality. However, other parameters may be used instead, for example probability that transmission power is within a predefined range or probability that user throughput is within a predefined range.

In the example, of the probability that transmission power is within a predefined range, in case the wireless device is approaching the coverage limit, this would mean that the transmission power would have to increase. This would be an alternative to using the BLER that would likely modify the MCS instead.

In the example of the probability that user throughput is within a predefined range, in the case that the channel conditions would deteriorate, this may also be handled by a change of the MCS.

In an example, the information associated with the channel quality of a channel between the network node and the wireless device comprises acknowledgement(s), ACK(s), negative acknowledgement(s), NACK(s) associated with Automatic Repeat Request, ARQ, or hybrid ARQ, HARQ.

The channel quality together with the MCS may result in successful reception of transmissions e.g. at the wireless device resulting in the reception at the network node of a HARQ ACK. Analogously, the channel quality together with the MCS may result in failure of reception of transmissions e.g. at the wireless device resulting in the reception at the network node of a HARQ NACK.

The HARQ ACK and the HARQ NACK may also be reflective of the variable representative of channel quality, e.g. BLER. The higher the HARQ ACK, the lower the BLER and the higher the HARQ NACK, the higher the BLER.

Consequently, by the ratio between the received HARQ ACKs and HARQ NACKs, the network node may estimate a BLER. In this manner, both the HARQ ACKs, the HARQ NACKs and the BLER may all be associated with channel quality in relation with the MCS being in use.

When one or more of the variable is/are outside the respective predefined interval, then the determining 130 of the OLLA adjustment may comprise determining an OLLA adjustment based on a difference between the estimated respective one or more variables and a respective target value for the respective one or more variables.

The variable(s) should be within the respective predefined interval for the variable. Merely as an example, when the estimated BLER is outside its predefined interval, also referred to as its desired range, the network node may take actions to swiftly get the BLER to fall within its predefined interval. By determining the OLLA adjustment based on the difference between the estimated BLER and the target value (being within its predefined interval), the network node may assure that the OLLA adjustment is relatively representative of the difference between the estimated BLER and the target BLER. The network node may then select an MCS based on the OLLA adjustment to swiftly adjust the MCS accordingly.

When a result of the SHT is inconclusive, then the determining 130 of the OLLA adjustment may comprise not changing the OLLA adjustment as previously determined.

Different results of the SHT may cause the network node to determine the OLLA adjustment differently. For example, when the result indicates that the BLER is outside its predefined interval or desired range, meaning that it is relatively far from its target value, then the network node may determine an OLLA adjustment that may incur a relatively big change in MCS.

When the variable is within its predefined interval, e.g. when the BLER is within its desired range (relatively close to and/or acceptably far from its target value), the SHT may give an inconclusive result. Then the network node may not change the OLLA adjustment. Firstly, the variable is within its predefined interval implicitly meaning that e.g. BLER (and consequently also the channel quality in relation to the MCS) is acceptable. Any change of the OLLA adjustment may possibly result in a change of MCS rendering the variable to fall outside its predefined interval. Consequently, the network node may leave the OLLA adjustment as it is in order to still keep the value of the variable (e.g. the BLER) within its desired range.

When a result of the SHT is that hypothesis H0 is selected, then the determining (130) of the OLLA adjustment may comprise stepping up 135 the OLLA adjustment and perform an SHT based on the updated OLLA adjustment.

Figure 1B:
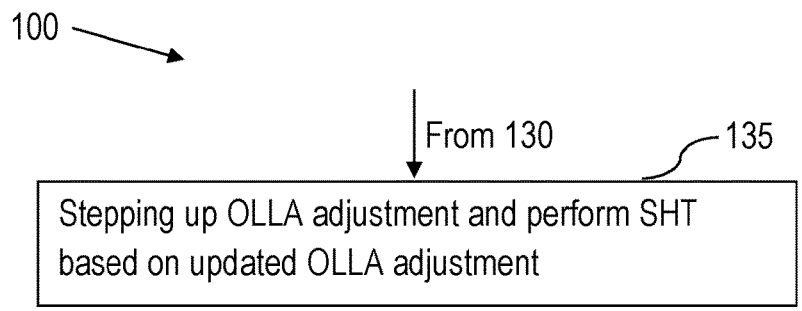
FIG. 1b is a flowchart of a method performed by a network node for communication between the network node and a wireless device, according to yet an exemplifying embodiment.

In this scenario, illustrated in FIG. 1b, the network node may deduce that the channel condition in relation to the used MCS may not be good enough. For example, the network node may use a too aggressive an MCS, thereby wasting radio resources. The wireless device may successfully receive (and/or decode/demodulate) transmitted signals when a less aggressive MCS is used. If so, the network node may step up the OLLA adjustment in order to subsequently select a corresponding MCS that better corresponds to the radio conditions. In other words, stepping up the OLLA adjustment may lead to a selection of MCS that better copes with the current radio conditions such that for example a BLER close to its target value is achieved and radio resources are exploited to a as a large extent as possible.

When a result of the SHT is that hypothesis H1 is selected, then the determining (130) of the OLLA adjustment comprises stepping down (136) the OLLA adjustment and perform an SHT based on the updated OLLA adjustment.

Figure 1C:
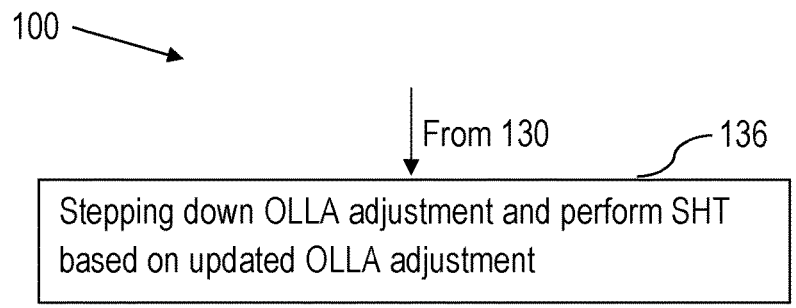
FIG. 1c is a flowchart of a method performed by a network node for communication between the network node and a wireless device, according to still an exemplifying embodiment.

In this scenario, illustrated in FIG. 1c, the network node may deduce that the channel condition in relation to the used MCS may too efficient so that unnecessary resources are wasted. For example, the wireless device may fail to too large an extent to successfully receive (and/or decode/demodulate) transmitted signals. If so, the network node may step down the OLLA adjustment in order to subsequently select a corresponding MCS that better corresponds to the radio conditions. In other words, stepping down the OLLA adjustment may lead to a selection of MCS that better copes with the current radio conditions such that for example a BLER close to its target value is achieved.

The proposed strategy considers a controller for OLLA that operates in three operation modes. The first operation mode aims to quickly compensate for large changes in the SINR inaccuracies. The second operation mode aims to compensate medium size changes in the SINR inaccuracies, and the third operation mode makes no change in the outer loop adjustments for small SINR inaccuracies.

The first operation mode may be implemented using a first control strategy, also referred to as a first controller mode algorithm. This operation mode is activated only when the perceived BLER is close to either zero or one. The third operation mode is used when the estimated BLER is close to the target, and the second operation mode is used when the estimated BLER is in the intermediate regions. The second operation mode may be implemented using a second control strategy, also referred to as a second controller mode algorithm. The third operation mode may be implemented using a third control strategy, also referred to as a third controller mode algorithm. When the perceived BLER is close to zero, there are hardly any block errors, wherein resources may be wasted by e.g. having a too aggressive a MCS. When the perceived BLER is close to one, there are so many block errors that the receiver is likely to not be able to correctly receive any information, wherein a more aggressive MCS is needed in order for the receiver to correctly receive the transmitted information.

The second and third operation modes are implemented using a strategy based in SHT. SHT detects with a minimum number of HARQ acknowledgements when the perceived BLER is outside of a desired BLER range. Using this feature of the method, the controller is able to keep the perceived BLER within a desired BLER range using a reduced number of control actions. In particular, the outer loop controller does not update the outer loop adjustments whenever the perceived BLER is within the desired BLER range.

Figure 2:
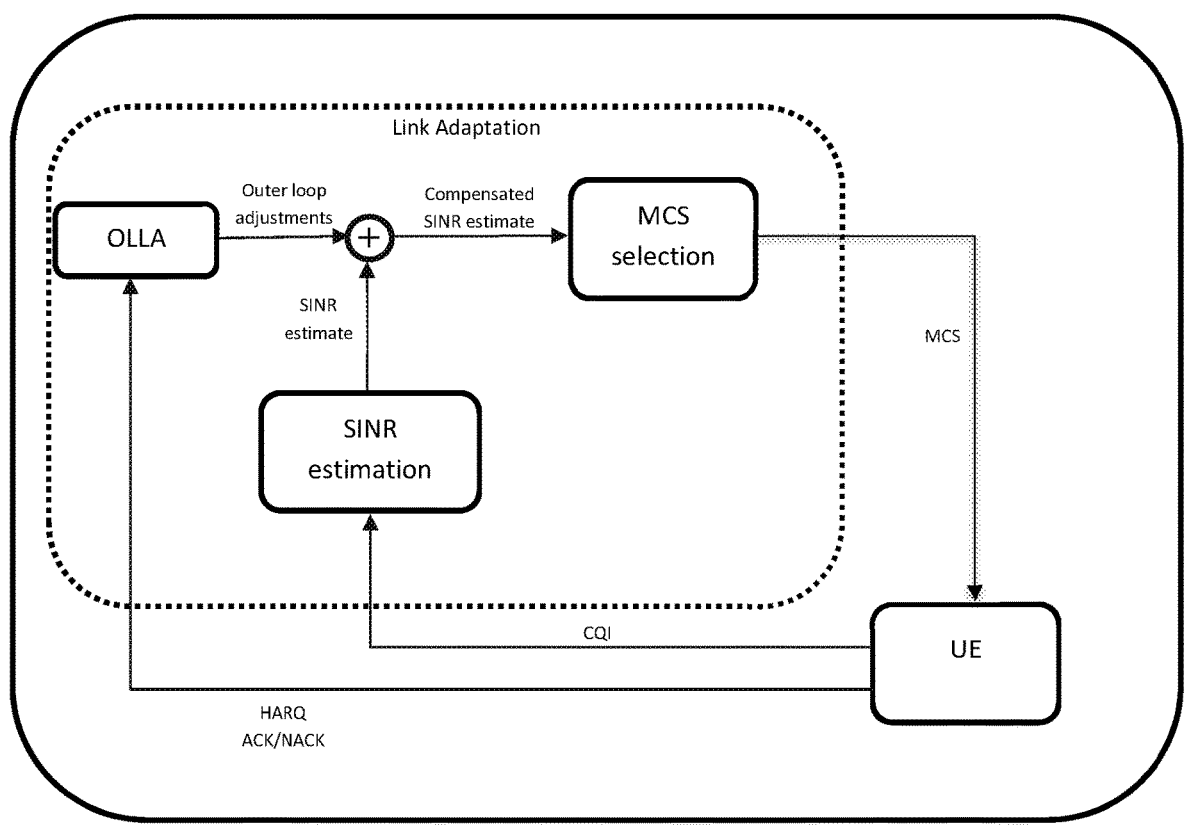
FIG. 2 is a block diagram of an Outer Loop Link Adaptation, OLLA, according to an example.

The above described solution provides a method for determining the outer loop adjustments to be applied to compensate inaccuracies in the SINR estimates. FIG. 2 shows a general, or classic, scheme for link adaptation. In this scheme, the wireless device sends a CQI report to the network node. The network node uses the reported CQI values to generate an estimate of the SINR (in logarithmic units). This SINR estimate, denoted as $\hat{\gamma}$, may be inaccurate due to delays and/or a systematic bias in the CQI reports. The aim of the OLLA is to compensate for these SINR inaccuracies by applying an additive adjustment, $\Delta_{OLLA}$, to the SINR estimate, i.e. the compensated SINR estimate, $\hat{\gamma}^{comp}$, is computed as follows:

$$\hat{\gamma}^{comp} = \hat{\gamma} + \Delta_{OLLA} \quad (1)$$

The compensated SINR estimate may later be used to compute the MCS. The OLLA uses current and past HARQ acknowledgements as inputs and provides as an output the value of the outer loop adjustment, $\Delta_{OLLA}$ that compensate for SINR inaccuracies. Note that FIG. 2 exemplifies OLLA for the downlink but this does not restrict the solution described herein to be applied also to the uplink direction or using other control variables for example the received uplink SINR; also the location of the algorithm is not restricted to be in a base station such as an evolved Node B, eNB, or the wireless device such as a UE, if necessary information is transferred to and from the method being implemented in the network node as described above. That is, the network node may be a base station, but it may also be a base station controller, like an MME. For new connections, the starting value for OLLA adjustments may use an initial value that is constant, or derived from some other algorithm, for example using information derived from other cells that the UE have been connected to.

Figure 3A:
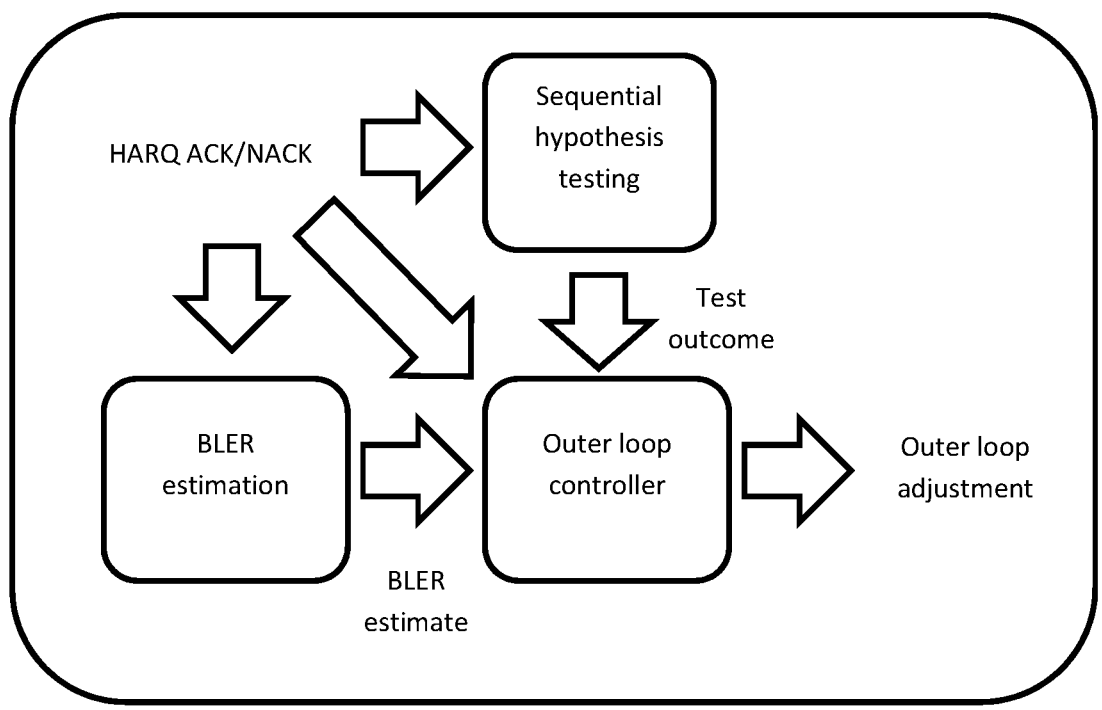
FIG. 3a is a block diagram illustrating a method of an Outer Loop Link Adaptation, OLLA, according to example.

FIG. 3a shows an exemplifying signal diagram and some components of the proposed method. There are two blocks dedicated to analyse HARQ acknowledgements in this example. The first of these blocks is dedicated to Sequential Hypothesis testing (SHT). The SHT block uses the HARQ acknowledgements to compute a SHT outcome. The second block is dedicated to use HARQ acknowledgement for BLER estimation purposes. The output of this block is a BLER estimate. Next in this example, the SHT outcome, the BLER estimate and the HARQ acknowledgements are passed to an outer loop controller. This outer loop controller may use this information to compute the outer loop adjustment that compensates for inaccuracies in the SINR estimates.

For a better understanding of the method described herein, a brief overview of sequential hypothesis testing and how is used in the method is provided. Sequential hypothesis testing (SHT) is a statistical method to compare two competing hypotheses. This hypothesis testing strategy determines which hypothesis is more likely to be true, and this may be achieved with a minimum number of observations. In this case, the BLER is desired to be within the range [$p_0$, $p_1$] SHT is used to evaluate the competing hypothesis H0: BLER≤$p_0$ and the hypothesis H1: BLER≥$p_1$. These hypotheses have associated risks that are described by parameters $\alpha$ and $\beta$. Parameter $\alpha$ is the probability of accepting H1 when H0 is true, and $\beta$ is the probability of accepting H0 when H1 is true. Every time that a HARQ acknowledgement is received, a hypothesis test is performed that has three possible outcomes: (i) accept H0; (ii) accept H1; and (iii) the test is inconclusive. More details of this statistical test are given later in this disclosure. The parameters $\alpha$ and $\beta$ may be determined by an operator implementing the solution described herein.

The statistical test mentioned above may be used to check if the BLER is within a desired range. Whenever the statistical test reports that the BLER is outside the desired range, the controller will update the outer loop adjustment to bring back the BLER to the desired range and it will readjust the statistical test. Note that the statistical test may not come to a termination if the BLER is within the desired range. This means that the controller may not update the outer loop adjustment until the BLER is outside the desired range.

In more detail, the SHT block may perform a statistical test that evaluates two competing hypothesis:

H0: BLER≤$p_0$
H1: BLER≥$p_1$

The statistical test may be performed as follows. Define as $y_m$ to the m-th HARQ observation, where $y_m=1$ if a NACK is received and $y_m=0$ if an ACK is received. Next, using the values of $\alpha$, $\beta$, $p_0$ and $p_1$ compute A, R and T as follows:

$$A = \frac{\log\left(\frac{\beta}{1-\alpha}\right)}{\log\left(\frac{p_1(1-p_0)}{p_0(1-p_1)}\right)}; \quad R = \frac{\log\left(\frac{1-\beta}{\alpha}\right)}{\log\left(\frac{p_1(1-p_0)}{p_0(1-p_1)}\right)}; \quad (2)$$

$$T = \frac{\log\left(\frac{1-p_0}{1-p_1}\right)}{\log\left(\frac{p_1(1-p_0)}{p_0(1-p_1)}\right)}$$

Initialize $\xi_0=0$, and with every new sample compute:

$$\xi_m = \xi_{m-1} + y_m - T \quad (3)$$

The test is inconclusive if $A < \xi_m < R$, and further observations may be needed. At the first time that $\xi_m$ does not lie between A and R, the test is terminated. H0 is accepted if $\xi_m \leq A$ and accept H1 if $\xi_m \geq R$.

There are more intuitive ways to determine the SHT parameters $\alpha$ and $\beta$ Let $N_{nack}$, be the minimum number of NACK samples required to accept H1. Similarly, $N_{ack}$ is defined as the minimum number of ACK samples required to accept H0. Then, A and R may be computed without directly selecting $\alpha$ and $\beta$, as follows:

$$A = -N_{ack} \cdot T$$

$$R = N_{nack} \cdot (1-T)$$

In case that it is desired to select $\alpha=\beta$, then it is needed to choose A=−R. An exemplifying configuration comprises selecting $N_{nack}=2$ and $\alpha=\beta$.

The SHT parameter, T, may be interpreted as a BLER target. In fact if neither $p_0$ or $p_1$ is close to 0 or 1, then $T \approx 0.5(p_0+p_1)$. However, if it is assumed that $p_0 \approx 0$ and it is desirable to set T≈BlerTarget, then by selecting $p_1$ equals to a value larger than BlerTarget and compute $p_0$ as follows:

$$p_0 = \frac{p_1}{(1-p_1)^{(1-1/BlerTarget)}} \quad (4)$$

T≈BlerTarget is obtained. These values of T, $p_0$ and $p_1$ provide a more intuitive interpretation of the SHT parameters.

Figure 3B:
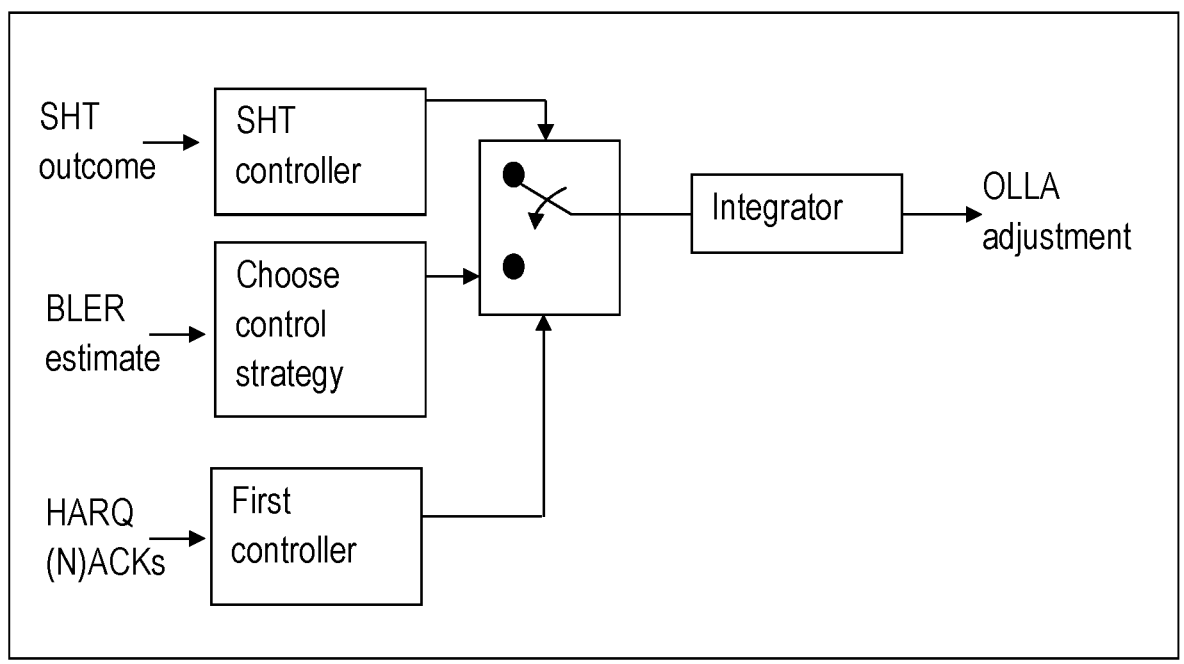
FIG. 3b is a block diagram schematically illustrating an exemplifying internal configuration of an OLLA controller.

Next, the outer loop controller is described. FIG. 3b shows a diagram of the internal configuration of the outer loop controller. First, the outer loop controller may use the current BLER estimate to choose an appropriate control operation mode. If the current value of the BLER estimate is close to either zero or one, then the first operation mode may be selected and the first controller may be used. In all other operation modes, the SHT controller may be used. The first controller aims to quickly compensate for large changes in the inaccuracies of the SINR estimates. On the other hand, the SHT controller aims to compensate for small and medium size SINR inaccuracies.

The first operation mode of the outer loop controller, which aims to compensate for large changes in the SINR inaccuracies, may be implemented using a first controller. In general, the first controller will be only used whenever the BLER estimate has a value close to either one or zero. A more precise rule for the activation of first controller is provided below. Since the first controller is used only when the BLER estimate takes these extreme values, a controller implementation stepping up and down may quickly compensate for the difference between the BLER estimate and a BLER target.

The SHT controller is responsible for implementing the second and third operation modes of the outer loop controller. These operation modes aim to compensate for medium and small size SINR inaccuracies, respectively. The SHT controller may take actions based on the hypothesis test outcomes. Every time a SHT outcome is received, the SHT controller may perform one of the following actions:

When the SHT outcome is inconclusive, the SHT controller takes no action and the outer loop adjustment remains the same.

When the SHT outcome is "accept H0", then the controller steps up the outer loop adjustment, and start a new hypothesis test.

When the SHT outcome is "accept H1", then the controller steps down the outer loop adjustment and start a new hypothesis test.

The size for the steps on the outer loop adjustment may be given as follows:

$$\text{StepUp}=c_1 \cdot \text{BlerTarget} \cdot N_{ack}$$

$$\text{StepDown}=c_1(1-\text{BlerTarget}) \cdot N_{nack}$$

Where $c_1>0$ is a user-supplied parameter, $N_{ack}=-A/T$ and $N_{nack}=R/(1-T)$. The scaling factors $N_{ack}$ and $N_{nack}$ are included to take into account the fact that each hypothesis test requires a minimum number of samples before it accepts either H0 or H1. The user supplied parameter $c_1$ should satisfy that $0<c_1<p_1-p_0$. This may be necessary to avoid oscillations in the outer loop in link adaptation.

A criterion to activate the first operation mode may be whenever the BLER estimate is either much less than $p_0$ or much greater than $p_1$. The exact threshold value may depend on how fast the estimate of the BLER reacts to a large change in the true BLER value. In particular, for an estimator that quickly reacts to a large change in the BLER value, the threshold values to activate the first operation mode may be as extreme as $(p_0)^{N_{ack}}$ and $1-(p_0)^{N_{ack}}$. In general, slightly less extreme values may be used for the threshold values.

Some variants of the disclosed method comprise skipping the use of the BLER estimate to choose the appropriate control strategy in the outer loop controller, and using the HARQ acknowledgments instead. Another variant is to choose a different controlled, or manipulated, variable. Instead of controlling the BLER, one may choose to control other variables such as the probability that the transmitted power is within a desired range and the probability that the user throughput is within a desired range.

Figure 3C:
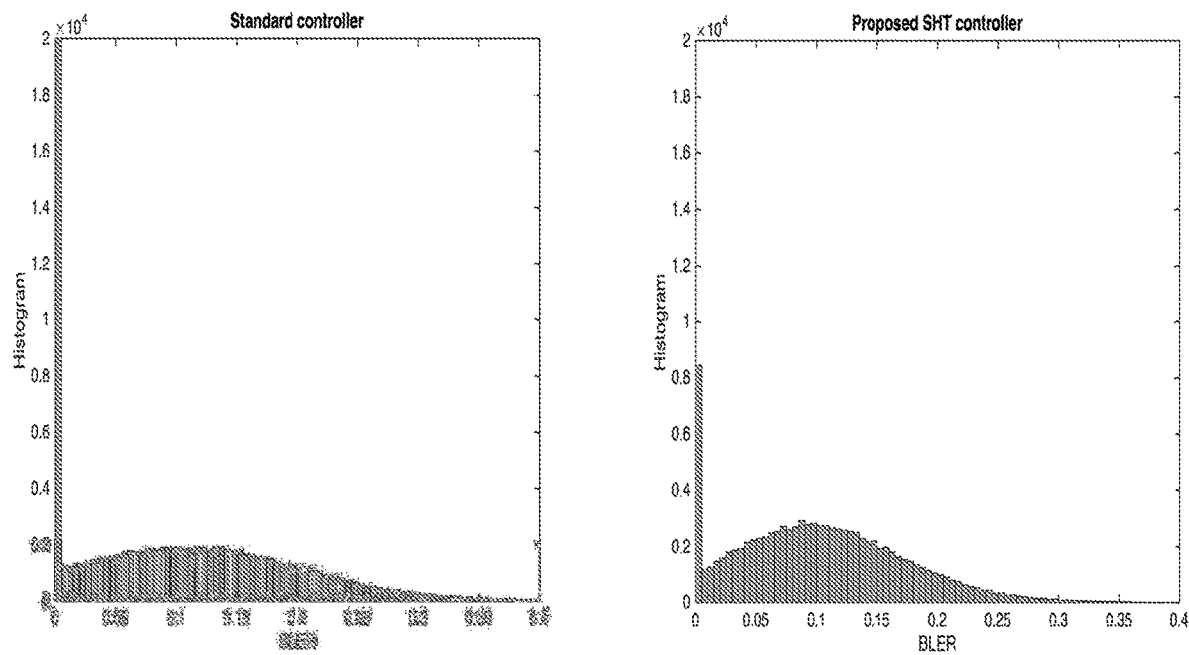
FIG. 3c is an illustration of simulation results.

To illustrate possible advantages of the herein described solution using the SHT controller some simulation results are presented. The simulation studies the steady-state performance of two controllers, namely, a standard controller and the proposed and herein described SHT controller. In order to provide a fair comparison, both controllers have been tuned to have a similar response to a large change in the channel conditions. The BLER target is set to 0.1 and the step down for the first controller is set to 0.1. FIG. 3c shows the histogram of the instantaneous BLER values over the simulation interval for both controllers. The histograms show that the disclosed SHT controller has a histogram that is more concentrated around the BLER target. Moreover, the histogram for the standard controller shows that the BLER take values close to zero more often than when the SHT controller is used. This means that the SHT controller may give a better use of the radio resources than the standard controller.

To sum up, an idea of the method according to the solution described herein is to use sequential hypothesis testing to determine when the BLER (or any other suitable variable) is outside of a desired BLER range, and to use the outcome of this statistical test for control purposes. The use of sequential hypothesis testing to control the outer loop in link adaptation generates an outer loop response that does not vary often. This may be beneficial because it may reduce unnecessary perturbations on the compensated SINR estimate that may affect other control mechanisms.

A second idea embedded in the method according to the solution described herein is the switching between a controller based in sequential hypothesis testing and other controllers based on for example the current BLER estimate. This feature may allow the outer loop controller to quickly compensate for large changes in the radio channel conditions, while preserving the benefits of SHT based control.

Embodiments herein also relate to a network node operable in a radio communication network for communication between the network node and a wireless device. The network has the same technical features, objects and advantages as the method performed by the network node described above. The network node will therefore be described only in brief in order to avoid unnecessary repetition. The network node will be described with reference to FIGS. 4 and 5.

Figure 4:
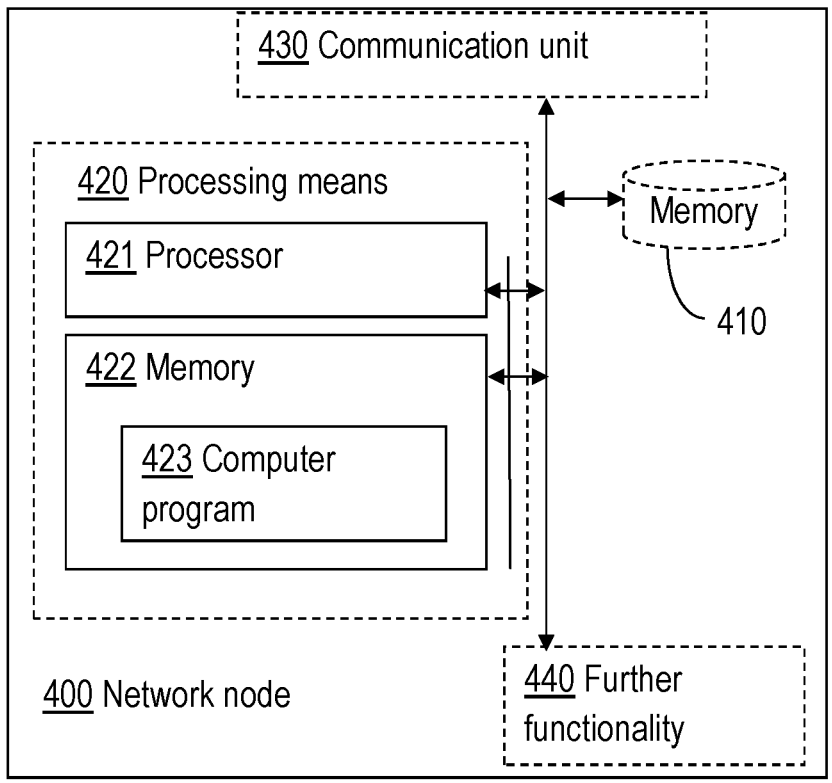
FIG. 4 illustrates an embodiment of a network node.

FIG. 4 illustrates the network node 400, 500 being configured for obtaining information associated with a channel quality of a channel between the network node and the wireless device; and for estimating a respective one or more variables associated with the channel quality based on the obtained channel quality information. FIG. 4 illustrates the network node 400, 500 being configured for determining an Outer Loop Link Adaptation, OLLA, adjustment based on the obtained channel quality information, and based on the estimated respective one or more variables associated with the channel quality, and when the obtained channel quality information indicates that the channel performance is acceptable: also based on a Sequential Hypothesis Testing, SHT, of the obtained channel quality information.

The network node 400, 500 may be realised or implemented in different ways. A first exemplifying implementation or realisation is illustrated in FIG. 4. FIG. 4 illustrates the network node 400 comprising a processor 421 and memory 422, the memory comprising instructions, e.g. by means of a computer program 423, which when executed by the processor 421 causes the network node 400 to obtain information associated with a channel quality of a channel between the network node and the wireless device; and to estimate a respective one or more variables associated with the channel quality based on the obtained channel quality information. The memory further comprises instructions, which when executed by the processor 421 causes the network node 400 to determine an Outer Loop Link Adaptation, OLLA, adjustment based on the obtained channel quality information, and based on the estimated respective one or more variables associated with the channel quality, and when the obtained channel quality information indicates that the channel performance is acceptable: also based on a Sequential Hypothesis Testing, SHT, of the obtained channel quality information.

FIG. 4 also illustrates the network node 400 comprising a memory 410. It shall be pointed out that FIG. 4 is merely an exemplifying illustration and memory 410 may be optional, be a part of the memory 422 or be a further memory of the network node 400. The memory may for example comprise information relating to the network node 400, to statistics of operation of the network node 400, just to give a couple of illustrating examples. FIG. 4 further illustrates the network node 400 comprising processing means 420, which comprises the memory 422 and the processor 421. Still further, FIG. 4 illustrates the network node 400 comprising a communication unit 430. The communication unit 430 may comprise an interface through which the network node 400 communicates with other nodes or entities of the radio communication network as well as other communication units. FIG. 4 also illustrates the network node 400 comprising further functionality 440. The further functionality 440 may comprise hardware or software necessary for the network node 400 to perform different tasks that are not disclosed herein.

Figure 5:
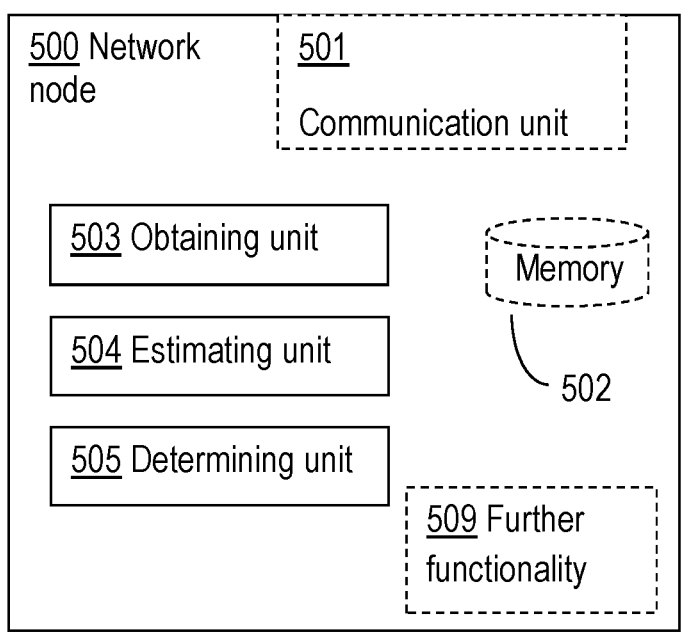
FIG. 5 illustrates a further embodiment of a network node.

An alternative exemplifying implementation of the network node 400, 500 is illustrated in FIG. 5. FIG. 5 illustrates the network node 500 comprising an obtaining unit 503 for obtaining information associated with a channel quality of a channel between the network node and the wireless device; and an estimating unit 504 for estimating a respective one or more variables associated with the channel quality based on the obtained channel quality information The network node 500 further comprises a determining unit 505 for determining an OLLA adjustment based on the obtained channel quality information, and based on the estimated respective one or more variables associated with the channel quality, and when the obtained channel quality information indicates that the channel performance is acceptable: also based on a Sequential Hypothesis Testing, SHT, of the obtained channel quality information.

In FIG. 5, the network node 500 is also illustrated comprising a communication unit 501. Through this unit, the network node 500 is adapted to communicate with other nodes and/or entities in the radio communication network. The network node 500 is further illustrated comprising a memory 502 for storing data. Further, the network node 500 may comprise a control or processing unit (not shown) which in turn is connected to the different units 503-505. It shall be pointed out that this is merely an illustrative example and the network node 500 may comprise more, less or other units or modules which execute the functions of the network node 500 in the same manner as the units illustrated in FIG. 5.

It should be noted that FIG. 5 merely illustrates various functional units in the network node 500 in a logical sense. The functions in practice may be implemented using any suitable software and hardware means/circuits etc. Thus, the embodiments are generally not limited to the shown structures of the network node 500 and the functional units. Hence, the previously described exemplary embodiments may be realised in many ways. For example, one embodiment includes a computer-readable medium having instructions stored thereon that are executable by the control or processing unit for executing the method actions or steps in the network node 500. The instructions executable by the computing system and stored on the computer-readable medium perform the method actions or steps of the network node 500 as set forth in the claims.

The network node has the same possible advantages as the method performed by the network node. One possible advantage is that the network node may take control actions less often. This is a consequence of that the network node not having to update the outer loop adjustments whenever the perceived variable representative of the channel quality is within a desired predefined range. This may be beneficial because it may reduce the perturbations introduced by an outer loop controller in a compensated SINR estimate. This helps to reduce the effects over other control mechanisms involved in the communication between the network node and the wireless device. Another possible advantage is that switching between control operation modes wherein the SHT is either involved or not may allow the OLLA to quickly respond to a large change in the SINR inaccuracies, and this may be achieved without a significant increase on the variance of the instantaneous BLER around a BLER target. All these features may improve the performance of the OLLA, and may result in an appropriate MCS selection. This may ultimately lead to a better use of the radio resources.

According to an embodiment, the network node is configured for performing the SHT of the obtained channel quality information against a respective predefined interval for the respective one or more variables associated with the channel quality information.

According to yet an embodiment, the respective predefined interval is defined by two end points, $p_0$ and $p_1$, wherein the SHT evaluates two hypotheses, H0: variable associated with the obtained channel quality information$\leq p_0$, and H1: variable associated with the obtained channel quality information$\geq p_1$.

According to still an embodiment, the estimated variable is BLER.

According to a further embodiment, the estimated variable is (a) probability that transmission power is within a predefined range, or (b) probability that user throughput is within a predefined range.

According to another embodiment, the information associated with the channel quality of a channel between the network node and the wireless device comprises ACK(s), NACK(s) associated with ARQ or HARQ.

According to an embodiment, when one or more of the variable is/are outside the respective predefined interval, then the network node is configured for determining the OLLA adjustment by determining an OLLA adjustment based on a difference between the estimated respective one or more variables and a respective target value for the respective one or more variables.

According to yet an embodiment, when a result of the SHT is inconclusive, then the network node is configured for determining the OLLA adjustment by not changing the OLLA adjustment as previously determined.

According to still an embodiment, when a result of the SHT is that hypothesis H0 is selected, then the network node is configured for determining the OLLA adjustment by stepping up the OLLA adjustment and perform an SHT based on the updated OLLA adjustment.

According to a further embodiment, when a result of the SHT is that hypothesis H1 is selected, then the network node is configured for determining (130) of the OLLA adjustment by stepping down (136) the OLLA adjustment and perform an SHT based on the updated OLLA adjustment.

Figure 6:
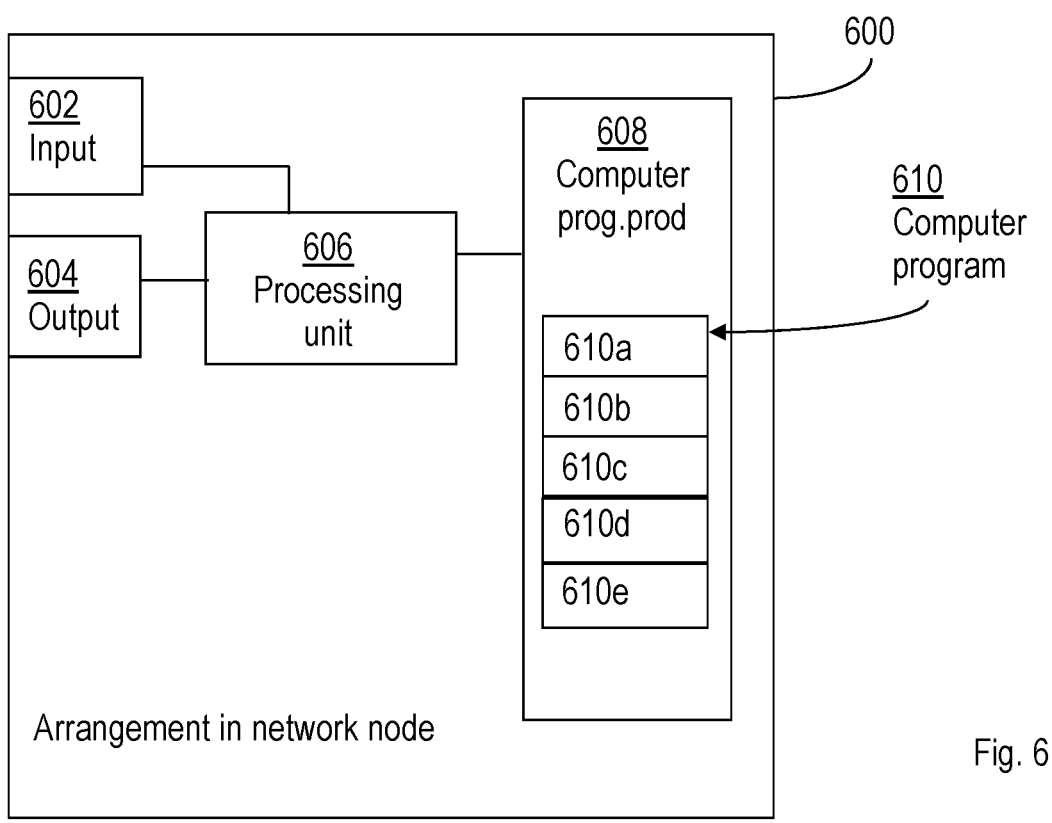
FIG. 6 illustrates an embodiment of an arrangement in a network node.

FIG. 6 schematically shows an embodiment of an arrangement 600 in a network node 500. Comprised in the arrangement 600 in the network node 500 are here a processing unit 606, e.g. with a Digital Signal Processor, DSP. The processing unit 606 may be a single unit or a plurality of units to perform different actions of procedures described herein. The arrangement 600 of the network node 500 may also comprise an input unit 602 for receiving signals from other entities, and an output unit 604 for providing signal(s) to other entities. The input unit and the output unit may be arranged as an integrated entity or as illustrated in the example of FIG. 5, as one or more interfaces 501.

Furthermore, the arrangement 600 in the network node 500 comprises at least one computer program product 608 in the form of a non-volatile memory, e.g. an Electrically Erasable Programmable Read-Only Memory, EEPROM, a flash memory and a hard drive. The computer program product 608 comprises a computer program 610, which comprises code means, which when executed in the processing unit 606 in the arrangement 600 in the network node 500 causes the network node to perform the actions e.g. of the procedure described earlier in conjunction with FIGS. 1a-1c.

The computer program 610 may be configured as a computer program code structured in computer program modules 610a-610e. Hence, in an exemplifying embodiment, the code means in the computer program of the arrangement 600 in the network node 500 comprises an obtaining unit, or module, for obtaining information associated with a channel quality of a channel between the network node and the wireless device; and an estimating unit, or module, for estimating a respective one or more variables associated with the channel quality based on the obtained channel quality information. The code means in the computer program of the arrangement 600 in the VNFM 500 further comprises a determining unit, or module, for determining an Outer Loop Link Adaptation, OLLA, adjustment based on the obtained channel quality information, and based on the estimated respective one or more variables associated with the channel quality, and when the obtained channel quality information indicates that the channel performance is acceptable: also based on a Sequential Hypothesis Testing, SHT, of the obtained channel quality information.

The computer program modules could essentially perform the actions of the flow illustrated in FIGS. 1a-1c, to emulate the network node 500. In other words, when the different computer program modules are executed in the processing unit 606, they may correspond to the units 503-505 of FIG. 5.

Although the code means in the embodiments disclosed above in conjunction with FIG. 5, is implemented as computer program modules which when executed in the respective processing unit causes the network node to perform the actions described above in the conjunction with figures mentioned above, at least one of the code means may in alternative embodiments be implemented at least partly as hardware circuits.

The processor may be a single Central Processing Unit, CPU, but could also comprise two or more processing units. For example, the processor may include general purpose microprocessors; instruction set processors and/or related chips sets and/or special purpose microprocessors such as Application Specific Integrated Circuits, ASICs. The processor may also comprise board memory for caching purposes. The computer program may be carried by a computer program product connected to the processor. The computer program product may comprise a computer readable medium on which the computer program is stored. For example, the computer program product may be a flash memory, a Random-Access Memory RAM, Read-Only Memory, ROM, or an EEPROM, and the computer program modules described above could in alternative embodiments be distributed on different computer program products in the form of memories within the network node.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a network node operable in a radio communication network for communication between the network node and a wireless device, the method comprising:
    obtaining information associated with a channel quality of a channel between the network node and the wireless device;
    estimating one or more variables associated with the channel quality based on the obtained information; and
    determining an Outer Loop Link Adaptation (OLLA) adjustment based on the following:
        the obtained information associated with the channel quality;
        the estimated one or more variables associated with the channel quality; and
        when the obtained information indicates that the channel performance is acceptable, on a Sequential Hypothesis Testing (SHT) of the one or more variables against respective predefined intervals for the one or more variables, wherein:
            each predefined interval is defined by two end points, $p_0$ and $p_1$; and
            for each variable, the SHT evaluates the following two hypotheses:
                H0: variable$\leq p_0$; and
                H1: variable$\geq p_1$.

2. The method according to claim 1, wherein the one or more variables include Block Error Rate (BLER).

3. The method according to claim 1, wherein the one or more variables include one of the following:
    probability that transmission power is within a predefined range; or probability that user throughput is within a predefined range.

4. The method according to claim 1, wherein:
the information associated with the channel quality comprises one or more acknowledgements (ACKs) and one or more negative acknowledgments (NACKs); and the ACKs and NACKs are associated with Automatic Repeat Request (ARQ) or hybrid ARQ (HARQ).

5. The method according to claim 1, wherein determining the OLLA adjustment comprises, when one or more of the variable are outside the respective predefined intervals, determining the OLLA adjustment based on respective differences between the one or more variables, outside of the respective predefined intervals, and corresponding respective target values within the respective predefined intervals.

6. The method according to claim 1, wherein when the SHT indicates an inconclusive result, determining the OLLA adjustment comprises not changing a previously-determined OLLA adjustment.

7. The method according to claim 1, wherein when the SHT indicates that hypothesis H0 is selected, determining the OLLA adjustment comprises stepping up the OLLA adjustment and performing a further SHT based on the stepped-up OLLA adjustment.

8. The method according to claim 1, wherein when the SHT indicates that hypothesis H1 is selected, determining the OLLA adjustment comprises stepping down the OLLA adjustment and performing a further SHT based on the stepped-down OLLA adjustment.

9. A network node operable in a radio communication network for communication between the network node and a wireless device, the network node comprising:
a processor; and
a memory storing computer-executable instructions that, when executed by the processor, configure the network node to:
obtain information associated with a channel quality of a channel between the network node and the wireless device;
estimate one or more variables associated with the channel quality based on the obtained information; and
determine an Outer Loop Link Adaptation (OLLA) adjustment based on the following:
the obtained information associated with the channel quality;
the estimated one or more variables associated with the channel quality; and
when the obtained information indicates that the channel performance is acceptable, on a Sequential Hypothesis Testing (SHT) of the one or more variables against respective predefined intervals for the one or more variables, wherein:
each predefined interval is defined by two end points, $p_0$ and $p_1$; and
for each variable, the SHT evaluates the following two hypotheses:
H0: variable$\leq p_0$; and
H1: variable$\geq p_1$.

10. The network node according to claim 9, wherein the one or more variables include Block Error Rate (BLER).

11. The network node according to claim 9, wherein the one or more variables include one of the following:
probability that transmission power is within a predefined range; or
probability that user throughput is within a predefined range.

12. The network node according to claim 9, wherein:
the information associated with the channel quality comprises one or more acknowledgements (ACKs) and one or more negative acknowledgments (NACKs); and
the ACKs and NACKs are associated with Automatic Repeat Request (ARQ) or hybrid ARQ (HARQ).

13. The network node according to claim 9, wherein execution of the instructions configures the network node to determine the OLLA adjustment, when one or more of the variables are outside the respective predefined intervals, based on respective differences between the one or more variables, outside of the respective predefined intervals, and corresponding respective target values within the respective predefined intervals.

14. The network node according to claim 9, wherein execution of the instructions configures the network node to determine the OLLA adjustment by not changing a previously-determined OLLA adjustment when the SHT indicates an inconclusive result.

15. The network node according to claim 9, wherein execution of the instructions configures the network node to determine the OLLA adjustment by stepping up the OLLA adjustment and performing a further SHT based on the stepped-up OLLA adjustment, when the SHT indicates that hypothesis H0 is selected.

16. The network node according to claim 9, wherein execution of the instructions configures the network node to determine the OLLA adjustment by stepping down the OLLA adjustment and performing a further SHT based on the stepped-down OLLA adjustment, when the SHT indicates that hypothesis H1 is selected.

* * * * *